United States Patent [19]
Cavitt et al.

[11] Patent Number: 4,602,070
[45] Date of Patent: Jul. 22, 1986

[54] THERMOSETTABLE EPOXY RESINS WITH IMPROVED IMPACT RESISTANCE

[75] Inventors: Michael B. Cavitt, Lake Jackson; David J. Duncan, Freeport, both of Tex.

[73] Assignee: The Dow Chemical Company, Midland, Mich.

[21] Appl. No.: 751,159

[22] Filed: Jul. 2, 1985

[51] Int. Cl.$^4$ .............................................. C08G 59/62
[52] U.S. Cl. .................................... 525/528; 523/400; 528/45; 528/73; 528/89; 528/93; 528/112
[58] Field of Search .................... 525/528; 528/73, 45, 528/112, 93, 89; 523/400

[56] References Cited

U.S. PATENT DOCUMENTS

| 2,970,983 | 2/1961 | Newey | 260/47 |
| 3,247,136 | 4/1966 | Wynstra et al. | 260/18 |
| 3,280,056 | 10/1966 | Masters | 260/21 |
| 3,446,762 | 5/1969 | Lopez et al. | 260/18 |
| 3,951,891 | 4/1976 | Töpfl et al. | 260/21 |
| 4,486,555 | 12/1984 | Kordomenos et al. | 523/400 |
| 4,486,556 | 12/1984 | Kordomenos et al. | 523/400 |
| 4,533,684 | 8/1985 | Kordomenos et al. | 525/528 X |

Primary Examiner—Earl Nielsen
Attorney, Agent, or Firm—J. G. Carter

[57] ABSTRACT

An advanced epoxy resin is prepared by reacting in the presence of a suitable catalyst such as ethyltriphenyl phosphonium acetate.acetic acid complex (A) a mixture containing (1) a polyglycidyl ether of a material containing at least two aliphatic hydroxyl groups per molecule such as a diglycidyl ether of a polyoxypropylene glycol and (2) a dicarboxylic acid such as malonic acid with (B) a dihydric phenol such as bisphenol A. These advanced epoxy resins are useful in the preparation of automobile paints, exterior coatings for beverage cans, coil coatings and adhesives.

40 Claims, No Drawings

THERMOSETTABLE EPOXY RESINS WITH IMPROVED IMPACT RESISTANCE

BACKGROUND OF THE INVENTION

The present invention pertains to advanced epoxy resins which have improved impact resistance. These resins are useful in the preparation of coatings and adhesives.

Automobiles are subject to being hit with gravel and other loose objects from the roadway and as such result in flakes of the paint system being removed at the points of impact. Present day automobile coatings usually consist of several layers, e.g. a corrosion resistant coating layer, a chip resistant coating layer, optionally a primer-surfacer coating layer and last a top coat layer or optionally a base color coating layer followed by a clear coating layer. It is desirable to have the painting system as resistant to chipping by these flying projectiles as possible. The present invention provides a resin suitable for use in the chip resistant coating formulation.

SUMMARY OF THE INVENTION

The present invention concerns an advanced epoxy resin prepared by reacting in the presence of a suitable catalyst (A) a mixture containing (1) at least one polyglycidyl ether of a material containing at least two aliphatic hydroxyl groups per molecule and (2) at least one dicarboxylic acid with (B) at least one material containing two phenolic hydroxyl groups per molecule.

Another aspect of the present invention pertains to a coating composition comprising the aforementioned advanced epoxy resin and at least one curing agent therefor.

Another aspect of the present invention pertains to a thermosettable composition comprising the aforementioned advanced epoxy resin and a curing quantity of at least one suitable curing agent therefor.

Another aspect of the present invention pertains to the product resulting from subjecting the thermosettable composition to conditions sufficient to effect curing thereof.

DETAILED DESCRIPTION OF THE INVENTION

The advanced epoxy resins of the present invention are prepared by reacting a mixture containing at least one polyglycidyl ether of a material containing at least two aliphatic hydroxyl groups per molecule and at least one dicarboxylic acid with at least one material containing two aromatic hydroxyl groups per molecule in the presence of at least one catalyst for effecting the reaction between the epoxy group and the acid and aromatic hydroxyl groups. The components are employed in a quantity which provides a ratio of the number of carboxylic acid equivalents to the number of phenolic hydroxyl equivalents to the number of epoxy equivalents of from about 0.08:0.5:1 to about 0.2:0.795:1, preferably from about 0.15:0.6:1 to about 0.197:0.793:1, most preferably from about 0.17:0.7:1 to about 0.196:0.790:1.

The precision of the amounts of the components is not required for three decimal places except that the sum of the number of carboxylic acid equivalents and the number of phenol hydroxyl equivalents should be less than 1:1 so as to prevent gellation of the product in the reaction vessel.

The term polyglycidyl ether means that the material contains an average of more than one glycidyl ether group per molecule.

Suitable glycidyl ethers of a material having at least two aliphatic hydroxyl groups include, for example, the glycidyl ethers of ethylene glycol, propylene glycol, diethylene glycol, dipropylene glycol, tripropylene glycol, 1,4-butanediol, 1,6-hexanediol, polyoxypropylene glycol, polyoxyethylene glycol, polyoxybutylene glycol, glycerine, 1,2,3-trihydroxybutane, 1,2,4-trihydroxybutane, trimethylol propane, neopentyl glycol, dibromoneopentyl glycol, hydrogenated Bisphenol A, cyclohexane dimethanol, mixtures thereof and the like.

Suitable dicarboxylic acids include, for example, malonic acid, succinic acid, glutaric acid, adipic acid, fatty dicarboxylic acids containing up to 48 carbon atoms, mixtures thereof and the like.

Suitable materials having two hydroxyl groups attached to an aromatic ring which can be employed herein include those represented by formulas I and II.

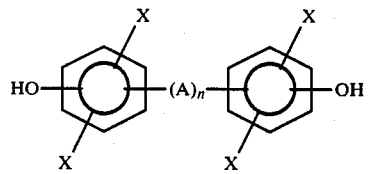

FORMULA I

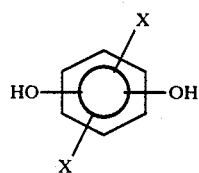

FORMULA II wherein A is a divalent hydrocarbyl group having from 1 to about 10 carbon atoms, —O—, —S—, —S—S—,

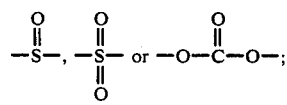

each X is independently hydrogen, a monovalent hydrocarbyl group having from 1 to about 10 carbon atoms or a halogen; and n has a value of zero or 1.

Suitable catalysts which can be employed herein to influence the reaction between the epoxy group, the carboxylic group and the phenolic hydroxyl group include, for example, ammonium compounds, phosphonium compounds, tertiary amines, mixtures thereof and the like.

Suitable tertiary amines include, for example, diethylenetriamine, n-methylmorpholine, triethylamine, tributylamine, benzyldimethylamine, tris(dimethylaminomethyl)phenol, mixtures thereof and the like.

Suitable phosphonium compounds include, for example, those disclosed by Dante et al in U.S. Pat. No. 3,477,990; Perry in Canadian Pat. No. 893,191 and U.S. Pat. No. 3,948,855; and Tyler, Jr. et al in U.S. Pat. No. 4,366,295 all of which are incorporated herein by reference.

Suitable ammonium compounds include, for example, benzyltrimethyl ammonium chloride, benzyltrimethyl ammonium hydroxide, tetramethyl ammonium hydroxide, tetrabutyl ammonium hydroxide, mixtures thereof and the like.

The quantity of catalyst varies from time to time, depending upon the conditions and the reactants employed, but is usually from about 0.0002 to about 0.004, preferably from about 0.0004 to about 0.002 mole of total catalyst per epoxide equivalent.

The temperature at which the epoxy component, dicarboxylic acid component and the phenolic hydroxyl component are reacted is usually from about 110° C. to about 200° C., preferably from about 160° C. to about 190° C.

Suitable curing agents include, for example, polyisocyanates, polyisothiocyanates, blocked polyisocyanates, blocked polyisothiocyanates, mixtures thereof and the like.

Suitable polyisocyanates include, for example, 2,4-toluenediisocyanate, 2,6-toluenediisocyanate, 4,4'-methylene diphenylisocyanate, hexamethylenediisocyanate, 4-methoxy-1,3-phenylene diisocyanate, polymethylene polyphenylisocyanate, biuret derivatives thereof, cyclic trimers and cocyclic trimers thereof, mixtures thereof and the like.

Suitable polyisothiocyanates include, for example, thio derivatives of the aforementioned polyisocyanates.

Suitable blocked polyisocyanates and blocked polyisothiocyanates include, for example, the aforementioned polyisocyanates and polyisothiocyanates blocked with a suitable blocking agent such as a phenol, lactam, oxime, mixtures thereof and the like. Particularly suitable blocking agents include for example, phenol, 4-chlorophenol, o-sec-butylphenol, caprolactam, acetaldehydeoxime, acetone oxime, methylethylketoxime, mixtures thereof and the like.

The mixture of the advanced epoxy resin and the curing agent is usually cured at temperatures of from about 120° C. to about 185° C., preferably from about 135° C. to about 165° C.

Suitable solvents which can optionally be employed herein include, for example, ketones such as, for example, methylisobutyl ketone, 2-heptanone, and the like; glycol ethers such as, for example, butylene glycol methyl ether, diethylene glycol n-butyl ether, diethylene glycol ethyl ether, diethylene glycol methyl ether, dipropylene glycol methyl ether, ethylene glycol n-butyl ether, ethylene glycol methyl ether, propylene glycol methyl ether, tripropylene glycol methyl ether; glycol esters such as, for example, ethylene glycol monoethyl ether acetate, ethylene glycol monobutyl ether acetate, ethylene glycol monomethyl ether acetate, propylene glycol monomethyl ether acetate, and the like; alcohols such as, for example, propanol, isopropanol, butanol, pentanol, and the like; and aromatic hydrocarbons such as, for example, toluene, xylene, mixtures thereof and the like.

The quantity of solvent which is employed is that quantity which is necessary to provide a suitable application viscosity.

If desired, catalysts, promoters or accelerators for the curing agents can be employed. Suitable such catalysts, promoters or accelerators for isocyanates or isothiocyanates include, for example, dimethyltin dilaurate, dibutyltin dilaurate, butyltin oxide, mixtures thereof and the like. Suitable such catalysts, promoters or accelerators for melamine-formaldehydes include, for example, p-toluene sulfonic acid, phenyl phosphoric acid, mixtures thereof and the like.

The compositions of the present invention can also be mixed and/or cured in the presence of fillers, pigments, dyes, leveling agents, flow control agents, accelerators, fire retardant agents, modifiers, mixtures thereof and the like.

The following examples are illustrative of the present invention but are not to be construed as limiting the scope thereof in any manner.

Tests employed in the examples were as follows.

SALT FOG TEST

The Salt Fog Test was run using cold rolled steel panels that were BONDERITE ® 40 treated available from Oxy Metal Industries Corp., Parker Division. The panels were unpolished and measured 4"×12"×20 ga. (101.6 mm×304.8 mm×0.94 mm). The coating formulations are shown in Table I. The panels were cured for 15 minutes (900 s) at 300° F. (149° C.). The panel was etched with an X then placed into a salt fog cabinet. The salt fog cabinet was run at 100% humidity, 95° F. (35° C.) and at a condensation rate of 1 ml condensate per hour (0.0002778 ml/s) using 5% sodium chloride in water solution. After 120 hours (432,000 s) the panels were removed to determine the amount of failure.

TABLE I

| RESIN FORMULATION FOR SALT FOG TEST | | | | |
|---|---|---|---|---|
| | FORM. 1 | FORM. 2 | FORM. 3 | FORM. 4 |
| Parts of Resin Solution | 1 | 1 | 1 | 1 |
| Curing Agent A | 0.32 | 0.64 | 0 | 0 |
| Curing Agent B | 0 | 0 | 0.2 | 0.3 |
| Catalyst B | 0.16 | 0.16 | 0 | 0 |
| Catalyst C | 0 | 0 | 0.032 | 0.032 |
| Solvent | 0.9 | 1.1 | 1 | 1.1 |

All parts are based on mass. Solvent was made by mixing 4 parts propylene glycol methyl ether, 2 parts xylene and 1 part methyl ethyl ketone together.

ANTI-STONE CHIP TEST

Panels used in this test were obtained from PPG Industries and were precoated with an electrodepositable coating (UNI-PRIME ED 3150). The coating formulation being tested was then applied on top of the UNI-PRIME coating and cured as indicated. The next coating was a primer-surfacer coating available from the Ford Motor Company, Industrial and Chemical Products Division as 6J119B. This coat was cured for 20 minutes (1200 s) at 300° F. (149° C.). The last coating was an enamel top coat available from Ford Motor Company, Industrial and Chemical Products Division as 50J107AN and was white in color. This appearance coat was baked at 265° F. (129° C.) for 17 minutes (1020 s).

Evaluation of the above test panels was accomplished by measuring the stone chip resistance. This test method is described in Society of Automotive Engineers (SAE) test method J400 which is incorporated herein by reference.

The coating formulations for use in the Anti-Stone Chip Test were prepared by mixing 1 part epoxy resin solution, 0.53 part of Curing Agent A, 0.16 part of Catalyst B, 0.8 part of Barytes (from Pfizer), 0.3 TiO₂ and enough n-butanol and AROMATIC 150 (commercially available from Exxon Company, U.S.A.) to obtain a sprayable viscosity but was between about 0.1 and about 0.275 part of each. All parts were based on mass. Coatings made from this formation were prebaked at 180° F. (82° C.) for 0.25 hour (900 s) then cured at 300° F. (149° C.) for 0.25 hour (900 s).

The following components were employed in the examples.

Curing Agent A was a methylethyl ketoxime blocked polyisocyanate available from Mobay Chemical Corporation as DESMODUR KL5-2540.

Curing Agent B was a melamine-formaldehyde resin available from American Cyanamid Company as CYMEL 325.

Catalyst A was a 70 weight percent solution of ethyltriphenylphosphonium acetate.acetic acid complex in methanol.

Catalyst B was a 15 weight percent solution of dibutyltin dilaurate in butanol.

Catalyst C was a 75 weight percent phenyl phosphoric acid in butanol.

Epoxy Resin A was a diglycidyl ether of a 400 weight average molecular weight polyoxypropylene glycol. The resin had an EEW of about 294.

The dicarboxylic acid used in the following examples was from Emery Industries designated as EMPOL 1014 Dimer Acid having an equivalent weight of 249 and referred to in the examples as dimer acid.

EXAMPLE 1

A glass flask equipped with a stirrer, thermometer, condenser, a nitrogen purge and an electrical heating mantle was charged, in order, with 591.2 g (2.011 epoxy equivalents) of Epoxy Resin A, 128.8 g (1.129 equivalents) of Bisphenol A, 80 g (0.321 equivalent) of dimer acid and then heated to 90° C. whereupon 2.5 g (0.004 mole) of Catalyst A was added. A nitrogen purge was maintained for the duration of the reaction. The reaction temperature was increased to 150° C., then heating stopped and the reaction mass exothermed to 187° C. The temperature was maintained at 185° C. for 2.17 hours (7812 s). The temperature was decreased to 140° C., nitrogen purge discontinued, and 200 g (1.754 moles) of 2-heptanone added. The resultant product had a 1354 EEW based on neat resin.

EXAMPLE 2

A glass flask equipped with a stirrer, thermometer, condenser, a nitrogen purge and an electrical heating mantle was charged, in order, with 180 g (0.612 epoxy equivalent) of Epoxy Resin A, 48.7 g (0.427 equivalent) of Bisphenol A, 14.25 g (0.057 equivalent) of dimer acid and then heated to 90° C. whereupon 0.75 g (0.0013 mole) of Catalyst A was added. A nitrogen purge was maintained for the duration of the reaction. The reaction temperature was increased to 180° C. and maintained at that temperature for 1.97 hours (7092 s). The temperature was decreased to 145° C., nitrogen purge discontinued, and 60.8 g (0.533 mole) of 2-heptanone added. The resultant product had a 1963 EEW based on neat resin.

EXAMPLE 3

A glass flask equipped with a stirrer, thermometer, condenser, a nitrogen purge and an electrical heating mantle was charged, in order, with 280.2 g (0.953 epoxy equivalent) of Epoxy Resin A, 73.9 g (0.648 equivalent) of Bisphenol A, 45.9 g (0.184 equivalent) of dimer acid and then heated to 90° C. whereupon 0.32 g (0.0005 mole) of Catalyst A was added. A nitrogen purge was maintained for the duration of the reaction. The reaction temperature was increased to 160° C., then increased to 185° C. and maintained 3.33 hours (11988 s). The temperature was decreased to 140° C., nitrogen purge discontinued, and 100 g (0.877 mole) of 2-heptanone added. The resultant product had a 2965 EEW based on neat resin.

EXAMPLE 4

A glass flask equipped with a stirrer, thermometer, condenser, a nitrogen purge and an electrical heating mantle was charged, in order, with 2213 g (7.527 epoxy equivalents) of Epoxy Resin A, 672 g (5.894 moles) of Bisphenol A, and then heated to 90° C. whereupon 3.0 g (0.0051 mole) of Catalyst A was added. A nitrogen purge was maintained for the duration of the reaction. The reaction temperature was increased to 150° C., then heating stopped and the reaction mass exothermed to 180° C. This temperature was maintained for 2.45 hours (8820 s) then 365 g (1.466 equivalents) of dimer acid was added. The temperature decreased to 145° C. An additional 4.0 g (0.0068 mole) of Catalyst A was added and the temperature was increased to 180° C. and maintained for 3.5 hours (12,600 s). The temperature was decreased to 145° C., nitrogen purge discontinued, and 812 g (7.123 moles) of 2-heptanone added. The resultant product had a 6418 EEW based on heat resin.

COMPARATIVE EXPERIMENT

A glass flask equipped with a stirrer, thermometer, condenser, a nitrogen purge and an electrical heating mantle was charged, in order, with 153.5 g (0.522 epoxy equivalent) of Epoxy Resin A and 96.5 g (0.387 equivalent) of dimer acid and then heated to 90° C. whereupon 0.5 g (0.0009 mole) of Catalyst A was added. The reaction temperature was increased to 150° C., then heating stopped and the temperature increased to 154° C. The reaction temperature was increased to 180° C. and maintained for 4.42 hours (15,912 s). The temperature was then decreased to 110° C., nitrogen purge discontinued, and 62.5 g (0.548 mole) of 2-heptanone added. The resultant product had a 1991 EEW based on neat resin.

Example 2 and the Comparative Experiment were formulated into coatings which were subjected to the Salt Fog Test. The results are reported in Table II.

TABLE II

| SAMPLE NUMBER | EPOXY RESIN | FORMULATION NUMBER | CREEP AFTER 120 HOURS (in.; mm) |
|---|---|---|---|
| A | Comparative Experiment | 1 | 16/32; 12.70 |
| B | Example 2 | 1 | 2/32; 1.59 |
| C | Comparative Experiment | 2 | 4/32; 3.17 |
| D | Example 2 | 2 | 1/32; 0.79 |
| E | Comparative Experiment | 3 | 26/32; 20.64 |
| F | Example 2 | 3 | 22/32; 17.46 |
| G | Comparative Experiment | 4 | 22/32; 17.46 |
| H | Example 2 | 4 | 10/32; 7.94 |

Examples 1, 2, 3 and 4 and the Comparative Experiment were formulated into coatings which were subjected to the anti-chip resistance test. The results are given in Table III.

TABLE III

| SAMPLE NUMBER | EPOXY RESIN | STONE CHIP RESISTANCE RATING | GARDNER-HOLT VISCOSITY AT 25° C. |
| --- | --- | --- | --- |
| I | Comparative Experiment | 8 | U-V |
| J | Example 1 | 9 | Q-R |
| K | Example 2 | 9− | V-W |
| L | Example 3 | 9− | W-X |
| M | Example 4 | 9 | Y-Z |

We claim:

1. An advanced epoxy resin prepared by reacting in the presence of a catalytic quantity of a suitable catalyst (A) a mixture containing (1) at least one polyglycidyl ether of a material containing at least two aliphatic hydroxyl groups per molecule and (2) at least one dicarboxylic acid with (B) at least one material containing two phenolic hydroxyl groups per molecule wherein the components are employed in quantities which provide a ratio of the number of carboxylic acid equivalents to the number of phenolic hydroxyl equivalents to the number of epoxy equivalents of from about 0.08:0.5:1 to about 0.2:0.795:1.

2. An advanced epoxy resin composition of claim 1 wherein
   (i) component (A-1) is a diglycidyl ether of a polyoxypropylene glycol;
   (ii) component (A-2) is a dicarboxylic acid having from about 4 to about 48 carbon atoms per molecule or a mixture thereof;
   (iii) component (B) is bisphenol A; and
   (iv) the components are employed in quantities which provide a ratio of the number of carboxylic acid equivalents to the number of phenolic hydroxyl equivalents to the number of epoxy equivalents of from about 0.15:0.6:1 to about 0.197:0.793:1.

3. An advanced epoxy resin composition of claim 2 wherein the components are employed in quantities which provide a ratio of the number of carboxylic acid equivalents to the number of phenolic hydroxyl equivalents to the number of epoxy equivalents of from about 0.17:0.7:1 to about 0.196:0.790:1.

4. An advanced epoxy resin composition of claim 1 which is prepared in the presence of a catalytic quantity of a phosphonium catalyst.

5. An advanced epoxy resin composition of claim 2 which is prepared in the presence of a catalytic quantity of a phosphonium catalyst.

6. An advanced epoxy resin composition of claim 3 which is prepared in the presence of a catalytic quantity of a phosphonium catalyst.

7. A curable composition comprising an advanced epoxy resin composition of claim 1 and a curing quantity of a suitable curing agent therefor.

8. A curable composition of claim 7 wherein said curing agent is a blocked polyisocyanate.

9. A curable composition of claim 8 wherein said blocked polyisocyanate is a ketoxime blocked polyisocyanate.

10. A curable composition comprising an advanced epoxy resin composition of claim 2 and a curing quantity of a suitable curing agent therefor.

11. A curable composition of claim 10 wherein said curing agent is a blocked polyisocyanate.

12. A curable composition of claim 11 wherein said blocked polyisocyanate is a ketoxime blocked polyisocyanate.

13. A curable composition comprising an advanced epoxy resin composition of claim 3 and a curing quantity of a suitable curing agent therefor.

14. A curable composition of claim 13 wherein said curing agent is a blocked polyisocyanate.

15. A curable composition of claim 14 wherein said blocked polyisocyanate is a ketoxime blocked polyisocyanate.

16. A curable composition comprising an advanced epoxy resin composition of claim 4 and a curing quantity of a suitable curing agent therefor.

17. A curable composition of claim 16 wherein said curing agent is a blocked polyisocyanate.

18. A curable composition of claim 17 wherein said blocked polyisocyanate is a ketoxime blocked polyisocyanate.

19. A curable composition comprising an advanced epoxy resin composition of claim 5 and a curing quantity of a suitable curing agent therefor.

20. A curable composition of claim 19 wherein said curing agent is a blocked polyisocyanate.

21. A curable composition of claim 20 wherein said blocked polyisocyanate is a ketoxime blocked polyisocyanate.

22. A curable composition comprising an advanced epoxy resin composition of claim 6 and a curing quantity of a suitable curing agent therefor.

23. A curable composition of claim 22 wherein said curing agent is a blocked polyisocyanate.

24. A curable composition of claim 23 wherein said blocked polyisocyanate is a ketoxime blocked polyisocyanate.

25. A curable composition of claim 7 which is a coating composition containing a sufficient quantity of a suitable solvent so as to provide the composition with a suitable application viscosity.

26. A curable composition of claim 8 which is a coating composition containing a sufficient quantity of a suitable solvent so as to provide the composition with a suitable application viscosity.

27. A curable composition of claim 9 which is a coating composition containing a sufficient quantity of a suitable solvent so as to provide the composition with a suitable application viscosity.

28. A curable composition of claim 10 which is a coating composition containing a sufficient quantity of a suitable solvent so as to provide the composition with a suitable application viscosity.

29. A curable composition of claim 11 which is a coating composition containing a sufficient quantity of a suitable solvent so as to provide the composition with a suitable application viscosity.

30. A curable composition of claim 12 which is a coating composition containing a sufficient quantity of a suitable solvent so as to provide the composition with a suitable application viscosity.

31. A curable composition of claim 15 which is a coating composition containing a sufficient quantity of a suitable solvent so as to provide the composition with a suitable application viscosity.

32. A curable composition of claim 16 which is a coating composition containing a sufficient quantity of a suitable solvent so as to provide the composition with a suitable application viscosity.

33. A curable composition of claim 17 which is a coating composition containing a sufficient quantity of a suitable solvent so as to provide the composition with a suitable application viscosity.

34. A curable composition of claim 18 which is a coating composition containing a sufficient quantity of a suitable solvent so as to provide the composition with a suitable application viscosity.

35. A curable composition of claim 19 which is a coating composition containing a sufficient quantity of a suitable solvent so as to provide the composition with a suitable application viscosity.

36. A curable composition of claim 20 which is a coating composition containing a sufficient quantity of a suitable solvent so as to provide the composition with a suitable application viscosity.

37. A curable composition of claim 21 which is a coating composition containing a sufficient quantity of a suitable solvent so as to provide the composition with a suitable application viscosity.

38. A curable composition of claim 22 which is a coating composition containing a sufficient quantity of a suitable solvent so as to provide the composition with a suitable application viscosity.

39. A curable composition of claim 23 which is a coating composition containing a sufficient quantity of a suitable solvent so as to provide the composition with a suitable application viscosity.

40. A curable composition of claim 24 which is a coating composition containing a sufficient quantity of a suitable solvent so as to provide the composition with a suitable application viscosity.

* * * * *